(12) United States Patent
Isobe et al.

(10) Patent No.: US 11,619,922 B2
(45) Date of Patent: Apr. 4, 2023

(54) NUMERICAL CONTROL SYSTEM OF MACHINE TOOL

(71) Applicant: FANUC CORPORATION, Yamanashi (JP)

(72) Inventors: Gaku Isobe, Yamanashi (JP); Yoshihiro Watanabe, Yamanashi (JP); Hideaki Adachi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 430 days.

(21) Appl. No.: 16/843,741

(22) Filed: Apr. 8, 2020

(65) Prior Publication Data

US 2020/0341450 A1 Oct. 29, 2020

(30) Foreign Application Priority Data

Apr. 26, 2019 (JP) .............................. JP2019-085848

(51) Int. Cl.
*G05B 19/4063* (2006.01)

(52) U.S. Cl.
CPC ................ *G05B 19/4063* (2013.01); *G05B 2219/41112* (2013.01); *G05B 2219/49108* (2013.01)

(58) Field of Classification Search
None
See application file for complete search history.

(56) References Cited

U.S. PATENT DOCUMENTS

2017/0205804 A1\* 7/2017 Kuroki ............... G05B 19/4063

FOREIGN PATENT DOCUMENTS

JP 2015-203646 A 11/2015

\* cited by examiner

*Primary Examiner* — Sean Shechtman
(74) *Attorney, Agent, or Firm* — Studebaker & Brackett PC

(57) ABSTRACT

An object is to provide a numerical control system of a machine tool which can check a parameter that needs to be adjusted for each of a spindle and a motor. A numerical control system of a machine tool includes a parameter check function unit for checking a drive control parameter of a spindle, and the parameter check function unit includes: an acceleration/deceleration time measurement unit which measures an acceleration/deceleration time that elapses after the spindle receives an acceleration command and/or a deceleration command until the completion of acceleration and/or the completion of deceleration; an acceleration/deceleration time specified value storage unit which stores a specified value of the acceleration/deceleration time that is previously determined for each specification of the machine tool; and a determination unit which compares the acceleration/deceleration time measured with the acceleration/deceleration time measurement unit and the specified value stored in the acceleration/deceleration time specified value storage unit so as to determine whether or not the drive control parameter of the spindle is proper.

3 Claims, 2 Drawing Sheets

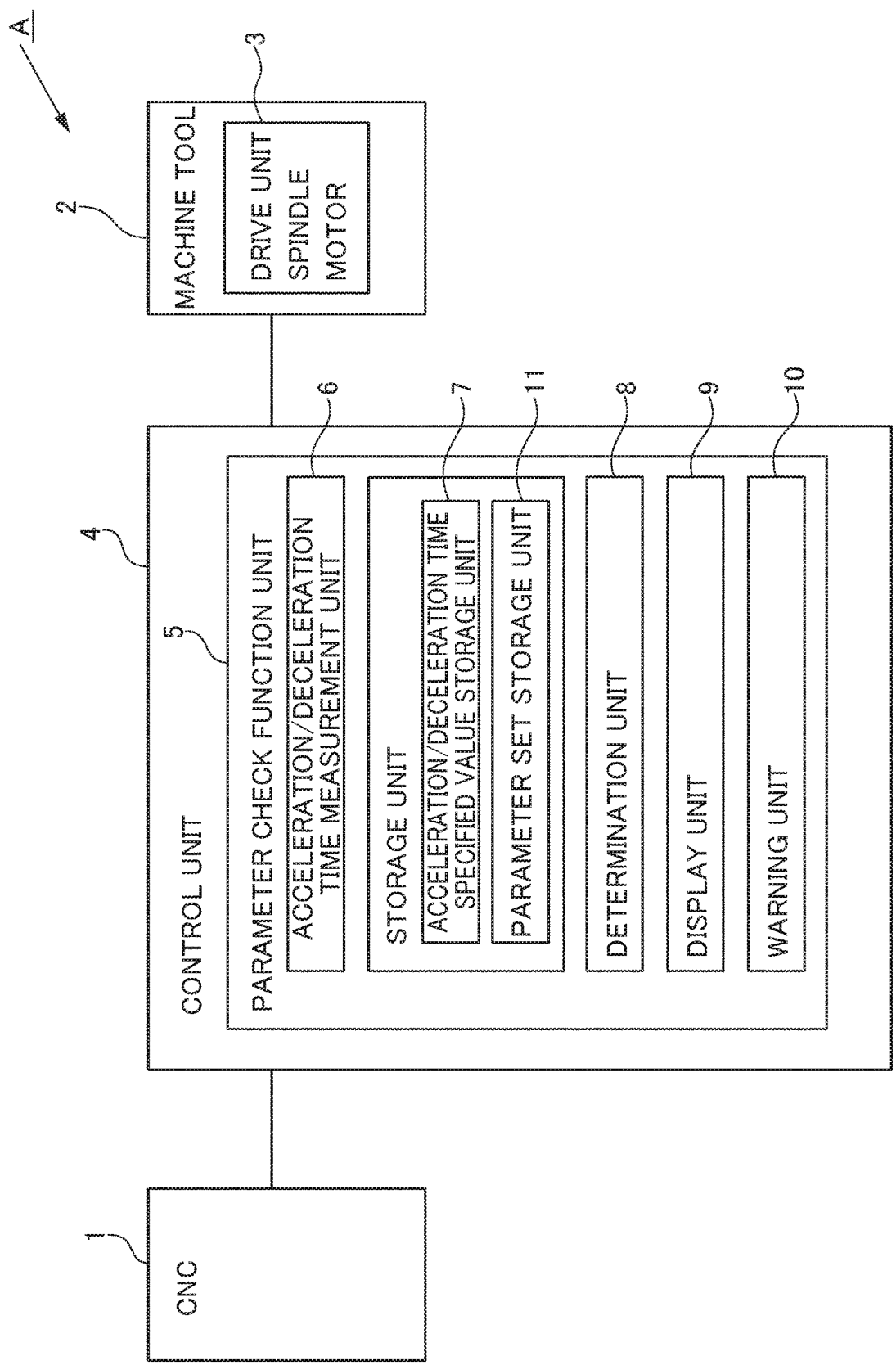

NUMERICAL CONTROL SYSTEM OF MACHINE TOOL

This application is based on and claims the benefit of priority from Japanese Patent Application No. 2019-085848, filed on 26 Apr. 2019, the content of which is incorporated herein by reference.

BACKGROUND OF THE INVENTION

Field of the Invention

The present invention relates to a numerical control system of a machine tool.

Related Art

As is known, in the field of machine work, CNC (Computerized Numerical Control) technology is applied, the amount of movement, the speed of the movement and the like are numerically controlled with a computer and thus the repetition of the same operation, a complicated operation and the like are highly automated. Data which is produced with a CAD or a CAM is taken into a CNC, various types of data such as options, parameters, an NC program, a macro program, a macro variable, a work piece origin offset, a tool offset, tool shape data and tool management data are further input and thus control is performed, with the result that an NC machine tool such as an NC lathe or a machining center is also automated consistently from design to manufacturing.

On the other hand, when proper parameters are not set according to the specifications of a spindle and a spindle motor which are installed, the spindle of a machine tool is not properly operated. Hence, a parameter set (parameter list) for each specification which is previously recorded, and current parameters are compared, and thus an error in the parameters is checked.

Patent Document 1 discloses "a method of diagnosing a machine tool that includes: an initial acquisition step of measuring, while operating the machine tool with a predetermined operation pattern, a plurality of parameters of the machine tool so as to acquire initial measurement data; a generation step of using the initial measurement data as training data so as to generate a normal region in a mapping space of a one-class support vector machine method; a reacquisition step of measuring, after the operation of the machine tool, while operating again the machine tool with the predetermined operation pattern, the parameters so as to acquire remeasurement data; and a diagnosis step of diagnosing the machine tool by using the remeasurement data as test data based on whether or not the test data is included in the normal region in the mapping space of the one-class support vector machine method".

Patent Document 1: Japanese Unexamined Patent Application, Publication No. 2015-203646

SUMMARY OF THE INVENTION

Here, although there is a case where a parameter needs to be individually adjusted with a specific value of a motor, a specific value of a spindle or the like, in such a case, with the conventional parameter check function described above, it is impossible to check a parameter which needs to be adjusted for each the spindle and the motor.

More specifically, for example, a parameter which indicates a position relationship between the rotation reference position and the magnetic pole position of a synchronous spindle motor is a specific value for each motor, and when motors are replaced, the parameter needs to be changed, but it is impossible to check the parameter with the parameter check function described above, with the result that when the parameter is wrong, a spindle is not properly rotated.

One aspect of a numerical control system of a machine tool according to the present disclosure is a numerical control system of a machine tool including a spindle to which a tool is fitted and which is driven to rotate so as to perform machining, wherein the numerical control system includes a parameter check function unit for checking a drive control parameter of the spindle, and the parameter check function unit includes: an acceleration/deceleration time measurement unit which measures an acceleration/deceleration time that elapses after the spindle receives an acceleration command and/or a deceleration command until the completion of acceleration and/or the completion of deceleration; an acceleration/deceleration time specified value storage unit which stores a specified value of the acceleration/deceleration time that is previously determined for each specification of the machine tool; and a determination unit which compares the acceleration/deceleration time measured with the acceleration/deceleration time measurement unit and the specified value stored in the acceleration/deceleration time specified value storage unit so as to determine whether or not the drive control parameter of the spindle is proper.

In one aspect of the numerical control system of the machine tool according to the present disclosure, it is possible to thoroughly check parameters, including the parameter which needs to be adjusted for each the spindle and the motor, and thus it is possible to reliably remove an inconvenience in which the spindle is not properly rotated due to a wrong parameter.

BRIEF DESCRIPTION OF THE DRAWINGS

FIG. 1 is a block diagram showing a numerical control system of a machine tool according to an embodiment of the present disclosure.

DETAILED DESCRIPTION OF THE INVENTION

Figure 2A:
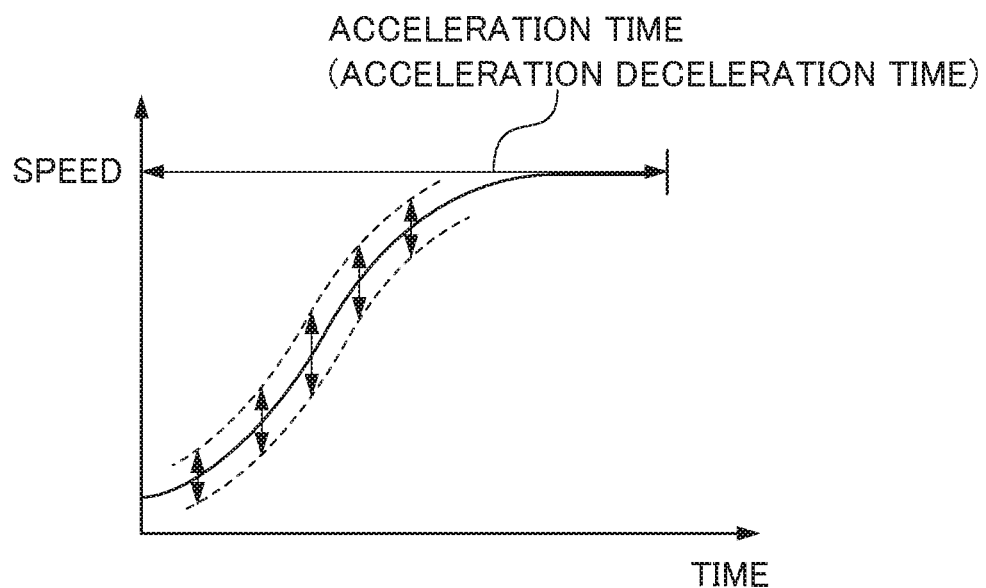
FIG. 2A is a diagram which is used to describe a parameter check function in the numerical control system of the machine tool according to the embodiment of the present disclosure.

A numerical control system of a machine tool according to an embodiment will be described below with reference to FIGS. 1, 2A and 2B. The present embodiment relates to the numerical control system of the machine tool which includes a parameter check function for checking whether or not the drive control parameter of a spindle (motor) in the machine tool to which a tool is fitted is proper.

Specifically, the numerical control system A of the machine tool in the present embodiment includes, as shown in FIG. 1, a CNC 1 of a command unit and a control unit 4, which controls a drive unit 3 for individual axes (an X axis, a Y axis and a Z axis) of the machine tool 2 based on a command from the CNC 1. Examples of a main constituent element of the drive unit 3 include motors such as a servo motor and a stepping motor, a spindle and the like, and examples of the control unit 4 include a servo amplifier and the like. The CNC 1 and the control unit 4 may be formed integrally.

On the other hand, the control unit 4 includes a parameter check function unit 5 for checking the drive control parameter of the spindle (motor) in the machine tool.

The parameter check function unit 5 of the present embodiment includes: an acceleration/deceleration time measurement unit (acceleration deceleration time measurement unit) 6 which measures an acceleration/deceleration time that elapses after the spindle of the machine tool 2 to which the tool is fitted and which is driven to rotate so as to perform machining receives an acceleration command and/or a deceleration command until the completion of acceleration and/or the completion of deceleration; an acceleration/deceleration time specified value storage unit (acceleration deceleration time specified value storage unit) 7 which stores a specified value of the acceleration/deceleration time (time in a normal state which elapses after the reception of the command until the completion of the acceleration/deceleration) that is previously determined for each specification of the machine tool 2; a determination unit 8 which compares the acceleration/deceleration time measured with the acceleration/deceleration time measurement unit 6 and the specified value stored in the acceleration/deceleration time specified value storage unit 7 so as to determine whether or not the rotation of the spindle is proper; a display unit 9 which displays, when the determination unit 8 determines that the rotation of the spindle is abnormal, information thereof; and a warning unit 10 which issues a warning when the determination unit 8 determines that the rotation of the spindle is abnormal.

Here, the determination unit 8 of the present embodiment compares the acceleration/deceleration time measured with the acceleration/deceleration time measurement unit 6 and the specified value stored in the acceleration/deceleration time specified value storage unit 7 so as to determine whether or not the parameter is proper (proper/improper), and thereby determines whether the rotation of the spindle is normal or abnormal.

In addition thereto, in the parameter check function unit 5 of the present embodiment, the spindle of the machine tool 2 is not controlled to be decelerated but is naturally decelerated, and the determination unit 8 can determine, for example, from a state at the time of natural deceleration such as sound or vibration at the time of natural deceleration or a natural deceleration time, whether or not a mechanical abnormality such as a failure in the spindle or the motor occurs.

The parameter check function unit 5 of the present embodiment also includes a parameter set storage unit 11 which is a conventional parameter check function, and which stores a parameter set (parameter list) for each specification that is previously recorded. The determination unit 8 also compares the parameter set stored in the parameter set storage unit and current parameters so as to be able to check an error in the parameters.

Figure 2B:
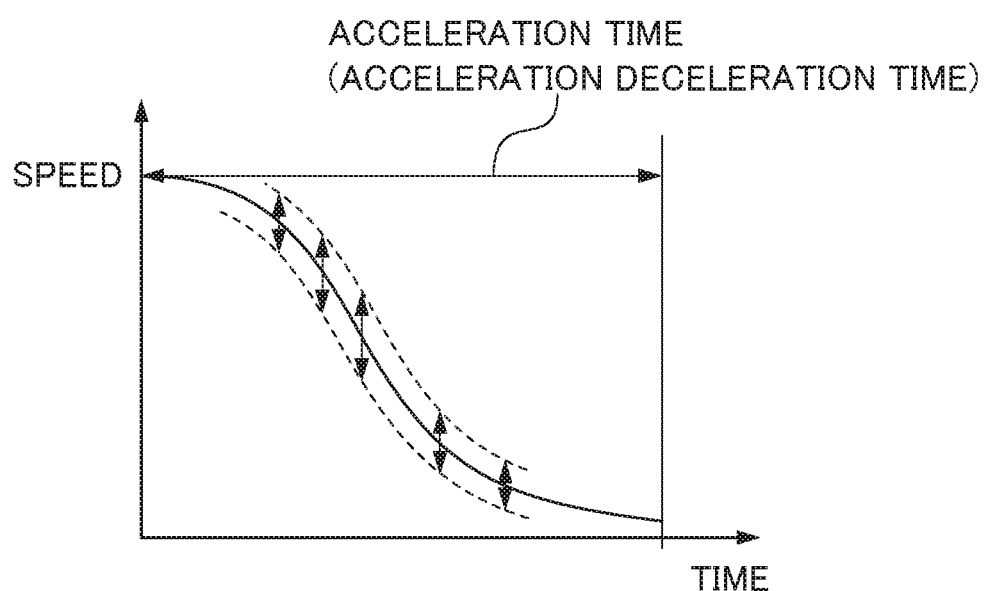
FIG. 2B is a diagram which is used to describe a parameter check function in the numerical control system of the machine tool according to the embodiment of the present disclosure.

In the numerical control system A of the machine tool in the present embodiment configured as described above, when the parameter check function unit 5 of the control unit 4 is used to check the parameters, the acceleration command is issued, and for example, as shown in FIG. 2A, the spindle (motor) is controlled to be forcefully accelerated to a predetermined number of revolutions (such as the maximum number of revolutions) and/or the deceleration command is issued, and as shown in FIG. 2B, the spindle (motor) is controlled to be forcefully decelerated from a predetermined large number of revolutions to a predetermined small number of revolutions.

The acceleration control and the deceleration control as described above are performed, and moreover, the acceleration/deceleration time measurement unit measures the acceleration/deceleration time which elapses after the reception of the command until the completion of the acceleration or the completion of the deceleration.

Moreover, the determination unit 8 compares the specified value stored in the acceleration/deceleration time specified value storage unit 7 and the measured acceleration/deceleration time. Here, an upper limit allowable value (upper threshold value) and a lower limit allowable value (lower threshold value) with respect to the specified value are previously set, and when the measured acceleration/deceleration time falls within a normal range (allowable range, normal range) between the upper limit allowable value and the lower limit allowable value, the determination unit 8 determines that the parameter is normal, that is, proper, whereas when the measured acceleration/deceleration time falls outside the normal range, the determination unit 8 determines that the parameter is not proper.

When the determination unit 8 determines that the parameter is not proper, the display unit 9 displays information thereof, and the warning unit 10 further issues a warning so as to make an operator or the like recognize this information.

For example, the display unit 9 and the warning unit 10 display characters such as OK or NG according to whether or not the parameter is proper or display, according to a state in the allowable range, the state by use of color such as blue, yellow or red. When the color is blue, it indicates that the parameter sufficiently falls within the allowable range so as to be in a proper state, when the color is yellow, it indicates that the parameter may fall outside the allowable range and thus a caution is given with a message or the like, and when the color is red, it indicates that the parameter falls outside the allowable range and thus an alarm is given and a stop is made.

Hence, in the numerical control system A of the machine tool in the present embodiment, when an error is made in the setting of the parameter, the acceleration/deceleration time falls outside the specified value, and thus it is possible to reliably detect an error in the parameter. The acceleration control and the deceleration control are performed, and thus it is possible to narrow down the cause from the state of a displacement in a measured value such as a displacement only at the time of acceleration with respect to a normal time, a displacement only at the time of deceleration or the amount of displacement at the time of acceleration or deceleration. In other words, it is possible to identify which one of drive control parameters is not proper.

Furthermore, here, in addition to the acceleration/deceleration time, the information of the load of the motor is acquired and recorded, whether the maximum load falls within the allowable range of the specified value is checked and the maximum load is added to determination elements, with the result that it is possible to further narrow down and identify which one of drive control parameters is not proper.

As in the conventional manner, the determination unit 8 may compare the parameter set and current parameters so as to check parameters other than the parameter which needs to be adjusted for each the spindle and the motor. The parameter set and current parameters are compared in this way, and thus it is possible to narrow down whether or not an error is made in the parameter which needs to be adjusted for each the spindle and the motor.

Furthermore, the spindle of the machine tool 2 is not controlled to be decelerated but is naturally decelerated, and whether or not a mechanical abnormality such as a failure in the spindle or the motor occurs may be determined, for example, from a state at the time of natural deceleration such as sound or vibration at the time of natural deceleration or a natural deceleration time. As described above, whether or not a mechanical abnormality in the spindle or the motor occurs is checked, and thus it is possible to narrow down whether or not an error is made in the parameter which needs to be adjusted for each the spindle and the motor and to detect a mechanical abnormality in the spindle or the motor.

In the numerical control system A of the machine tool in the present embodiment, the acceleration control and the deceleration control are performed, and thus it is possible to narrow down whether or not an error is made in the parameter which needs to be adjusted for each the spindle and the motor. Hence, the operation described above is incorporated in an operation during mass production machining, for example, when a machining operation is performed in a factory or partway through a machining operation, and furthermore, for example, when maintenance and inspection of the motor or the like are performed, whether or not an error is made in the parameter which needs to be adjusted for each the spindle and the motor can be checked and inspected, with the result that it is possible to obtain the parameter of a certainly proper adjustment value.

Hence, in the numerical control system A of the machine tool in the present embodiment, it is possible to thoroughly check parameters including the parameter which needs to be adjusted for each the spindle and the motor, and thus it is possible to reliably remove an inconvenience in which the spindle is not properly rotated due to a wrong parameter.

In the numerical control system A of the machine tool in the present embodiment, as compared with a determination using natural deceleration, it is possible to perform an inspection on an abnormality for a short period of time.

Here, in the numerical control system A of the machine tool, a configuration may be adopted where the parameter check function unit 5 includes, instead of the acceleration/deceleration time measurement unit 6, a spindle speed data recording unit which records chronological data of a spindle speed after the spindle receives the acceleration command and/or the deceleration command until the completion of the acceleration and/or the completion of the deceleration, and includes, instead of the acceleration/deceleration time specified value storage unit 7, a speed reference data storage unit which stores spindle speed reference data that is previously set for each specification of the machine tool, and where the determination unit 8 compares, as shown in FIGS. 2A and 2B, the chronological data of the spindle speed measured with the spindle speed data recording unit and the spindle speed reference data stored in the speed reference data storage unit so as to determine whether or not the parameter is proper, and thereby determines whether the rotation of the spindle is normal or abnormal.

In this case, as shown in FIGS. 2A and 2B, an upper limit allowable value (upper threshold value) and a lower limit allowable value (lower threshold value) indicated by broken lines in the figures are previously set with respect to the spindle speed reference data indicated in a solid line in the figures, and when the chronological data of the spindle speed measured falls within a normal range (allowable range, normal range) between the upper limit allowable value and the lower limit allowable value, the determination unit 8 determines that the parameter is normal, that is, proper whereas when the chronological data falls outside the normal range, the determination unit 8 determines that the parameter is not proper.

In this way, it is possible to obtain the same functional effects as in the present embodiment described above. In this case, the acceleration control and the deceleration control are performed, the chronological data of the spindle speed, the normal data and the allowable ranges are compared and thus it is possible to chronologically grasp, that is, to grasp, in each elapsed time, a displacement (displacement in each elapsed time) such as a displacement only at the time of acceleration with respect to a normal time, a displacement only at the time of deceleration or the amount of displacement at the time of acceleration or deceleration. In this way, it is possible to grasp, for example, characteristics of the state of a displacement so as to more accurately narrow down the cause and to thereby identify which one of drive control parameters is not proper.

Although the embodiment of the numerical control system of the machine tool is described above, the present invention is not limited to the embodiment described above, and modifications can be made as necessary without departing from the spirit thereof. For example, the present invention can also be applied to a machine tool of a lathe method in which not a tool, but a work piece is fitted to a spindle. The acceleration time of a feed axis instead of a spindle is measured, and thus the present invention can also be applied to the parameter check of the feed axis.

EXPLANATION OF REFERENCE NUMERALS

1 CNC (command unit)
2 machine tool
3 drive unit (spindle, motor)
4 control unit
5 parameter check function unit
6 acceleration/deceleration time measurement unit (acceleration deceleration time measurement unit, spindle speed data recording unit)
7 acceleration/deceleration time specified value storage unit (acceleration deceleration time specified value storage unit, speed reference data storage unit)
8 determination unit
9 display unit
10 warning unit
11 parameter set storage unit
A numerical control system of a machine tool

What is claimed is:

1. A numerical control system of a machine tool including a spindle to which a tool is fitted, and which is driven to rotate so as to perform machining, the numerical control system comprising:
   a parameter check function processor for checking a drive control parameter of the spindle,
   wherein the parameter check function processor is configured to:
   measure an acceleration/deceleration time that elapses after the spindle receives an acceleration command and/or a deceleration command until completion of acceleration and/or completion of deceleration;
   store a specified value of the acceleration/deceleration time that is previously determined for each specification of the machine tool;
   compare the measured acceleration/deceleration time and the stored specified value to determine whether or not the drive control parameter of the spindle is proper; and display information when it is determined that the drive control parameter of the spindle is not proper.

2. The numerical control system of the machine tool according to claim 1, wherein the parameter check function processor is configured to:

acquire not only the acceleration/deceleration time but also information of a load of a motor which drives and rotates the spindle and determines whether or not the drive control parameter of the spindle is proper by whether or not a maximum load of the motor falls within an allowable range.

3. The numerical control system of the machine tool according to claim 1, wherein the parameter check function processor is configured to:

acquire not only the acceleration/deceleration time but also information of a load of a motor which drives and rotates the spindle and determines whether or not the drive control parameter of the spindle is proper by whether or not a maximum load of the motor falls within an allowable range.

\* \* \* \* \*